Aug. 14, 1956   R. C. LASSIAT   2,758,881
APPARATUS FOR LIFTING GRANULAR SOLIDS
Filed Sept. 28, 1950

INVENTOR.
RAYMOND C. LASSIAT
BY
*Busser and Harding*
ATTORNEYS

United States Patent Office 2,758,881
Patented Aug. 14, 1956

2,758,881

APPARATUS FOR LIFTING GRANULAR SOLIDS

Raymond C. Lassiat, Swarthmore, Pa., assignor to Sun Oil Company, Philadelphia, Pa., a corporation of New Jersey Application September 28, 1950, Serial No. 187,226

3 Claims. (Cl. 302—53)

This invention relates to a system and apparatus for moving pneumatically granular or pelleted contact material or catalyst from a lower receptacle which receives the material in a continuous stream upwardly into an upper receptacle. In particular the invention is directed to the method of and apparatus for supplying gas, air or other fluid medium to the material in the lower receptacle in order to convey it therefrom to and through an elongate annular space in such a manner as to reduce attrition of the material particles or pellets to a minimum during passage to the upper receptacle.

It is well known in the art of catalytic operations, such as the cracking of heavier petroleum fractions to gasoline and other hydrocarbon processing operations to use a catalytic or contact material in a continuous system. In such continuous systems a conversion zone is operated continuously to produce the desired product while a second zone operates continuously in regeneration. Most commercial moving catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regenerating zone to the upper conversion zone two well known means applicable to the transportation of granular solids from one locus to another have been used, namely: by mechanical conveyors and by pneumatic conveyors, in the latter of which air, steam or flue gas produced at the refinery is readily available as the pneumatic lifting medium.

It is necessary in systems employing conversion and regeneration zones in superposed relationship to convey the catalyst or contact material which is usually in pelleted or granular form continuously upwardly to a height of several hundred feet, in order that it can be delivered continuously by gravity to these zones and maintain them in operation. Conveying the material upwardly by a fluid medium requires a receptacle positioned at a level below that of the lower reaction zone which is designed to effect the lifting or upward conveying operation. This lowermost receptacle is generally known in the art as an engager since the material is engaged therein by the lifting fluid to effect the lifting operation. A lift conduit has its lower end extending into or is in communication with the engager receptacle while its upper end communicates with an upper receptacle positioned at a level above the top of the upper reaction zone or chamber. The upper receptacle is designed so that the lifting medium is separated from the catalyst or contact material and is generally known as the disengager.

Specifically the present invention is directed to the engager portion of the continuous catalyst system and the particular arrangement of conduits which provide an annular space between the engager and disengager through which the material is raised and the manner of supplying the lifting fluid to force the material into the annular space and convey it upwardly thereof with a minimum of attrition of the material.

A more complete understanding of the present invention may be had by reference to the following description taken in connection with the accompanying drawings which form a part of the application in which.

Figure 1:
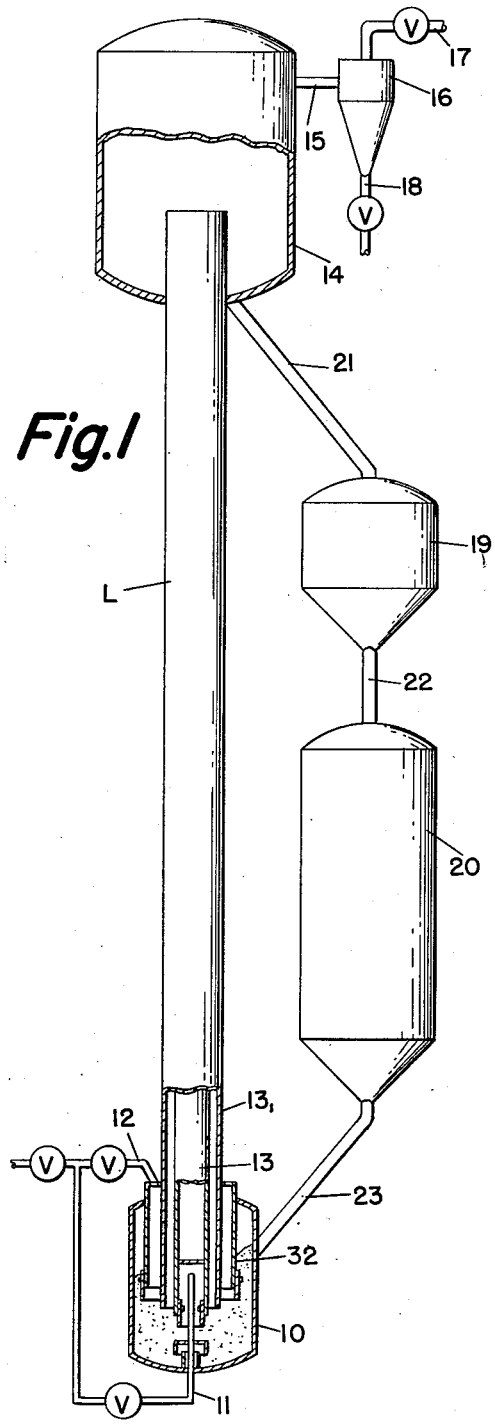
Figure 1 is an elevational view partly in section showing the improved arrangement as applied to a typical continuous contact material system.

Referring to Figure 1 of the drawing, which shows the various elements of a continuous system for utilizing contact material, a lower lift receptacle or chamber 10 functions as a catalyst engaging zone which is a zone wherein the catalyst is engaged by the fluid lifting medium. The fluid lifting medium can be supplied in various ways but for the purpose of explaining the present invention a conduit 11 extends upwardly into the chamber 10 to direct a stream of lifting fluid through the lower end of the engaging zone while a conduit 12 communicates through the top of the chamber to direct a stream of fluid downwardly. The lift conduit assembly is indicated generally at L and comprises an inner member 13 which as shown is hollow and an outer conduit $13_1$. The members $13$—$13_1$ are concentrically disposed to provide an annular passageway therebetween and their lower ends are positioned within the chamber 10 while their upper ends extend through the lower end of the upper chamber 14, providing an annular passageway between chambers 10 and 14. The chamber 14 functions to separate the lifting fluid from the contact material and the lifting fluid is discharged from the upper chamber 14 through a conduit 15 and is passed to any conventional separating means such as a cyclone separator 16 having an upper conduit 17 in communication therewith to remove separated gas and lower conduit 18 for removing any fines which had been entrained in the lifting medium.

The catalyst or contact material which remains in the disengager 14 is returned by gravity to an upper reaction chamber 19 wherein usually a reaction is effected to obtain the desired product and continues to flow by gravity into a lower reaction chamber 20 wherein the catalyst or contact material is regenerated to remove therefrom any deposits which have been formed in the upper chamber 19. From the lower chamber 20 catalyst or contact material continues to flow by gravity and is returned to the engaging chamber 10. The conduits 21, 22 and 23 through which the catalyst or contact material flows in returning from the disengager 14 to the engager 10 are usually provided with means for supplying steam or gaseous purging medium thereto in order to prevent reaction products formed in chamber 19 or regeneration fumes formed in chamber 20 from communicating with the other parts of the unit.

Figure 2:
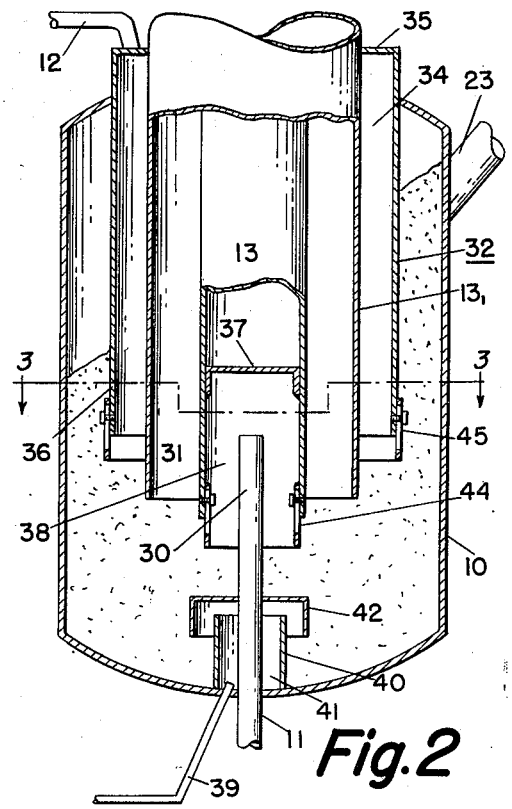
Figure 2 is an enlarged sectional elevation showing the engager portion of the system.
Figure 3:
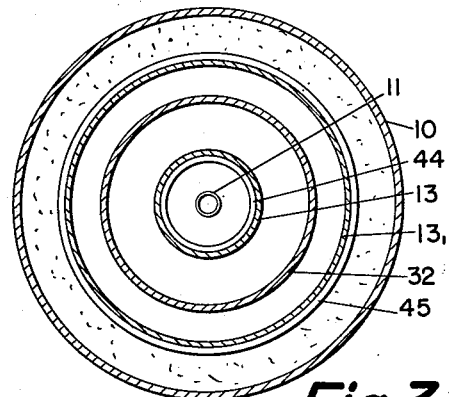
Figure 3 is a view taken along the line 3—3 of Figure 2.

Referring to Figures 2 and 3 an air supply conduit 11 extends upwardly through the bottom of the engager 10 and has its upper open end 30 positioned within the end of the inner member 13. The outer conduit $13_1$ provides with the inner member 13 an annular space 31 which as heretofore mentioned is in communication with the catalyst or contact material in the engager 10 and the annular space 31 extends upwardly to be in communication with the disengager 14. A sleeve 32 extends through the top of the engager and is concentric with and provides a space 34 with the outer conduit 13₁. The sleeve 32 has its upper end 35 closed while its lower end 36 is open to supply lifting fluid from conduit 12 at high velocity directly to the contact material within the chamber 10 at a point adjacent the lower end of the conduit 13¹. Directly above the upper end 30 of conduit 11 in the inner member 13 a partition 37 is provided which deflects the fluid from conduit 11 downwardly through the annular space 38, which the upper end 30 of conduit 11 forms with the inner member 13, and then upwardly into the annular space 31 lifting the material upwardly of the annular space 31. The portion of inner member 13 above the partition 37 may be hollow as shown or it may be solid since it functions only to provide with outer conduit 13₁ the annular passageway 31 between the engager 10 and disengager 14. The fluid medium is supplied through conduit 12 to the space 34 at high velocity and passes downwardly through the contact material and upwardly into the annular space 31 cooperating with the high velocity fluid from the annular space 38 in raising the contact material through the annular space 31 to the disengager 14. A low velocity fluid supply conduit 39 is provided for admitting fluid to the body of contact material through a conduit 40 providing a space 41 with fluid conduit 11 and a cap 42 in the form of a screen permits the fluid to diffuse out into the body of contact material to effect some agitation therein.

In order to provide for adjustment in the depth to which conduit 13₁ and sleeve 32 extends into the body of contact material skirts 44 and 45 respectively are provided and adjustment may be made through bolts which secure the skirts to the conduit and sleeve respectively.

In normal operation of a continuous catalytic cracking system catalyst will return by conduit 23 to the engager 10 continuously and will be lifted from the engager 10 upwardly into the disengager 14.

The function of the diffusing fluid supply is to keep the contact material in what may be considered a state of churning while the other fluid streams function to lift the contact material into and through the annular space 36.

It should be understood that the present invention is not directed to usual pneumatic conveying apparatus but is concerned with the continuous movement of catalyst or contact material from the engager 10 to the disengager 14 in such a manner that the catalyst or contact material is raised to the disengager 14 with the smallest degree of frictional contact of the catalyst or contact material with the lifting apparatus. Attrition of the catalyst or contact material in the lifting operation has presented a serious problem in continuous catalytic operations for several reasons. The expense of catalyst is such that any waste or production of fines in the catalytic operation can add greatly to the expense of operation. Another reason is that the production of a great quantity of fines within the catalyst system deleteriously affects the normal continuous movement of the catalyst since it is believed the fines tend to impact, for example, pellets or other granular material of which the catalyst or contact material is formed.

I claim:

1. Apparatus for elevating granular material from a lower chamber to an upper chamber comprising three concentric vertical tubes open at their lower ends and extending into the lower chamber and forming an inner passage, a middle annular passage and an outer passage, a conduit for feeding the granular material to the lower chamber and into the space below said tubes, the inner passage being closed above its lower end, the upper end of the outer passage being closed, a fluid conduit for feeding a high velocity fluid into the outer passage and thence discharging said fluid into the mass of granular material in the lower portion of the lower chamber, a second fluid conduit extending into the inner passage and terminating below its closed upper end for feeding high velocity fluid into the inner passage and thence downward into the granular material in the lower portion of the lower chamber, and a third fluid conduit extending into the lower portion of the lower chamber for feeding low velocity fluid thereto, the annular middle passage extending above the closed upper end of the inner chamber and communicating with the upper chamber and sealed from communication with the upper end of the inner passage.

2. The apparatus defined in claim 1 in which the lower ends of the inner, middle and outer passages are at progressively higher levels in the order specified, the lower ends of the outer and inner tubes comprising vertically adjustable skirts by means of which the levels of the lower ends of the inner and outer tubes may be varied.

3. The apparatus defined in claim 1 in which a perforated cap having a downwardly extending annular flange overlies the open end of the third conduit to thereby effect distribution of the low velocity oil through a relatively wide cross-section of the lower portion of the lower chamber.

References Cited in the file of this patent

UNITED STATES PATENTS

| 1,364,532 | Von Porat | Jan. 4, 1921 |
| 2,493,911 | Brandt | Jan. 10, 1950 |

FOREIGN PATENTS

| 180,397 | Great Britain | May 11, 1922 |